(12) United States Patent
Leathers

(10) Patent No.: US 6,637,215 B1
(45) Date of Patent: Oct. 28, 2003

(54) AIRCRAFT GROUND SUPPORT AIR CONDITIONING UNIT WITH HEAT EXCHANGER BYPASS

(75) Inventor: Thomas M. Leathers, Granger, IN (US)

(73) Assignee: Honeywell International, Inc., Morristown, NJ (US)

( * ) Notice: Subject to any disclaimer, the term of this patent is extended or adjusted under 35 U.S.C. 154(b) by 0 days.

(21) Appl. No.: 10/272,562

(22) Filed: Oct. 16, 2002

(51) Int. Cl.[7] .............................. F25B 9/00; F25B 39/04; F25D 9/00
(52) U.S. Cl. ................ 62/87; 62/401; 62/183
(58) Field of Search ................ 62/402, 401, 87, 62/88, 172, 183

(56) References Cited

U.S. PATENT DOCUMENTS

| | | | | |
|---|---|---|---|---|
| 2,557,099 A | * | 6/1951 | Green | 62/402 |
| 2,618,470 A | * | 11/1952 | Brown et al. | 165/62 |
| 2,767,561 A | * | 10/1956 | Seeger | 62/241 |
| 3,878,692 A | * | 4/1975 | Steves | 62/87 |
| 4,771,612 A | * | 9/1988 | Kurikka | 62/402 |
| 4,963,174 A | * | 10/1990 | Payne | 62/87 |
| 5,214,935 A | * | 6/1993 | Brunskill | 62/402 |
| 5,709,103 A | * | 1/1998 | Williams | 62/402 |
| 6,381,973 B1 | * | 5/2002 | Bhatti et al. | 62/172 |

* cited by examiner

Primary Examiner—William C. Doerrler
(74) Attorney, Agent, or Firm—Robert Desmond, Esq.

(57) ABSTRACT

A system and method of supplying temperature-controlled air to an aircraft environmental control system during ground support operations that uses a bypass valve in a bypass line to control the amount of cooling air flowing through a heat exchanger. The heat exchanger removes heat from a flow of compressed air supplied to the air conditioning unit and supplies cooled compressed air at a desired temperature. The temperature of the cooled compressed air is controlled by selectively positioning the bypass valve, which regulates cooling air flow through the heat exchanger.

19 Claims, 2 Drawing Sheets

AIRCRAFT GROUND SUPPORT AIR CONDITIONING UNIT WITH HEAT EXCHANGER BYPASS

FIELD OF THE INVENTION

The present invention relates to environmental control systems for aircraft and, more particularly, to a modular air conditioning unit for supplying temperature-controlled air to an aircraft while on the ground.

BACKGROUND OF THE INVENTION

Aircraft main engines not only provide propulsion for the aircraft, but in many instances may also be used to drive various other rotating components such as, for example, generators and pumps. The main engines may also be used to supply compressed air to the aircraft's environmental control system, which may be used to supply temperature-controlled air to both the aircraft cabin and to electronic equipment within the aircraft.

When an aircraft is on the ground and its main engines are not being used, an alternative power source may be used to supply power for ground support operations. In addition, during some ground support operations, an external supply of cooling or heating air may be used to supply temperature-controlled air to the cabin and onboard aircraft equipment. For some type of aircraft ground support applications, most notably military aircraft ground support applications, a ground power cart may be used to supply electrical power to the aircraft and compressed air to an air conditioning system module. The air conditioning module in turn may supply temperature-controlled air to the aircraft cabin and the aircraft's onboard electronic equipment.

One particular air conditioning system module that may be used during aircraft ground support operations receives high temperature (e.g., ≧300° F.) compressed air supplied by the ground cart, and conditions the compressed air to a predetermined temperature. The air conditioning system module may be used in at least two modes, a cooling mode, to supply cool air, or a heating mode, to supply warm air. To do so, the air conditioning system module may include a primary heat exchanger, a condenser, a moisture separator, and one or more cooling turbines. Typically, this air conditioning system module is designed so that when it is operating in the cooling mode it will supply cool air at a predetermined desired temperature for a given, predetermined design ambient temperature. For example, the system may be designed to supply cooling air at a temperature no higher than 55F when the ambient temperature is 125F. Thus, when actual ambient temperature is below the design ambient temperature, the air conditioning system may supply cooling air that is less than 55F.

In some instances, supplying air to an aircraft at less than 55F may not be desirable. Hence, the air conditioning system module may include a bypass flowpath that allows a portion of the high temperature compressed air to flow around the primary heat exchanger, and back into the cooler compressed air stream that is exhausted from the primary heat exchanger. For example, a valve may be installed in a bypass duct, and the valve may be positioned to control hot compressed air bypass flow rate, to thereby control the temperature exiting the primary heat exchanger, and in turn controlling the temperature of the air being supplied by the air conditioning system module.

Although the above-described system and method for controlling cooling air temperature to an aircraft during ground support operations is effective, it suffers certain drawbacks. For example, it can be difficult to consistently control the temperature of the cooling air by feeding a portion of the hot compressed air back into the compressed air that has been cooled. In addition, the cost of the air conditioning system module may be increased because high temperature ductwork and a high temperature valve may be needed to implement the compressed air bypass flow path.

Hence, there is a need for a system and method of providing temperature-controlled air to an aircraft environmental control system during ground support operations that does not use hot compressed air to control cooling air supply temperature when ambient temperature is below the maximum design temperature and/or is less costly than presently known systems and methods. The present invention addresses one or more of these needs.

SUMMARY OF THE INVENTION

The present invention provides a system and method of supplying temperature-controlled air to an aircraft environmental control system during ground support operations that is simple, efficient, and does not adversely affect system costs.

In one embodiment, and by way of example only, a temperature-controlled air supply system for use with a compressed air source and for connection to an aircraft on the ground includes a primary air flow passage, a bypass flow passage, a first heat exchanger, and a bypass valve. The primary air flow passage is coupled to receive a flow of primary air. The bypass flow passage is fluidly coupled in parallel with the primary air flow passage. The first heat exchanger has at least a first fluid flow path and a second fluid flow path. The first fluid flow path is fluidly coupled in series in the primary air flow passage, and the second fluid flow path is coupled to receive a flow of compressed air from the compressed air source. The first heat exchanger is adapted to transfer heat between the primary air and the compressed air and supply at least conditioned compressed air. The bypass valve is mounted on the bypass flow passage and is selectively moveable between a closed and an open position to control primary air flow rate through the bypass flow passage, whereby primary air flow rate through the first heat exchanger is controlled to thereby control conditioned compressed air temperature.

In another exemplary embodiment, a method of conditioning compressed air supplied from an aircraft ground support equipment includes supplying a flow of compressed air through a first heat flow path in a heat exchanger. A flow of primary air is supplied through a second flow path in the heat exchanger to thereby condition the compressed air to a temperature. A portion of the primary air is selectively diverted away from the second heat exchanger flow path to control primary air flow rate through the second heat exchanger flow path, whereby the temperature of the conditioned compressed air exiting the heat exchanger is controlled.

Other independent features and advantages of the preferred air conditioning system will become apparent from the following detailed description, taken in conjunction with the accompanying drawings which illustrate, by way of example, the principles of the invention.

DETAILED DESCRIPTION OF VARIOUS EMBODIMENTS

Figure 1:
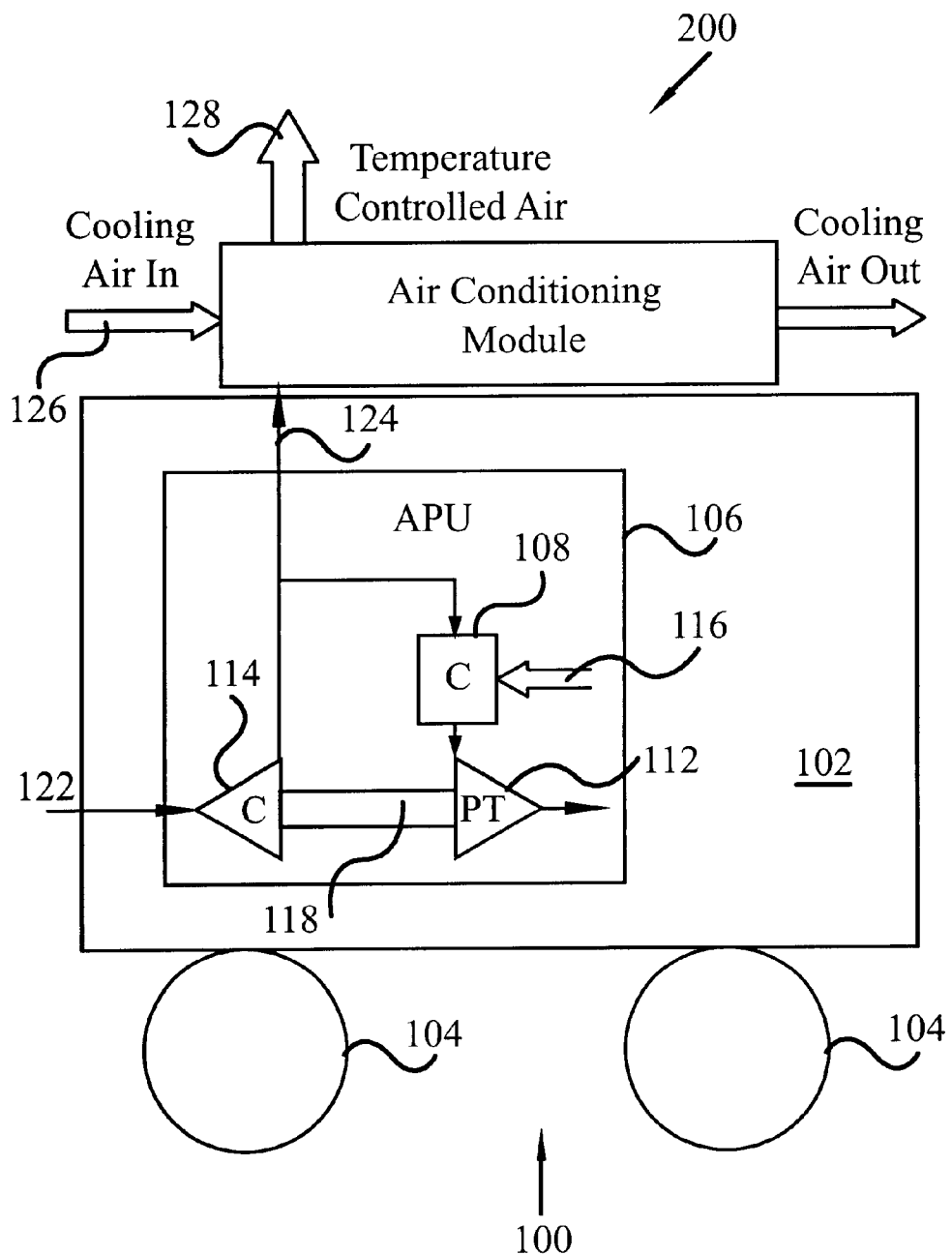
FIG. 1 is a simplified schematic diagram of a ground cart with a modular aircraft ground support air conditioning unit mounted thereon.

A simplified schematic representation of a ground cart 100 with a modular aircraft ground support air conditioning unit 200 mounted thereon is depicted in FIG. 1. The ground cart 100 includes a housing 102 and varying numbers of rotationally mounted wheels 104, which allow the cart 100 to be readily transported to one or more aircraft. Various systems and components may be mounted within the housing 102 to supply power and compressed air for ground support operations. In the depicted embodiment, an auxiliary power unit (APU) 106 is used. It should be appreciated that other systems and components may also be installed in the ground cart 100, but for the sake of clarity and ease of description, only a single APU is depicted.

The general operation and configuration of turbine APUs is well-known in the industry. In the depicted embodiment, APU 106 includes a combustor 108, a power turbine 112, and a compressor 114. During APU operation, the combustor receives fuel 116 from a fuel source (not illustrated) and supplies high energy air to the power turbine 112 causing it to rotate. The power turbine 112 includes a shaft 118 that may be used to drive a generator (not illustrated) for supplying electrical power, and to drive the compressor 114. The compressor 114 draws in ambient air 122, compresses it, and supplies compressed air 124 to the air conditioning module 200. It should be appreciated that the present embodiment is not limited to use with an APU as the compressed air source, and that various other devices and systems for supplying compressed air to the air conditioning module 200 may also be used. For example, a diesel or other type of engine driving a compressor or other engine-compressor types, or any type of stationary compressor, may also be used to provide compressed air.

Figure 2:
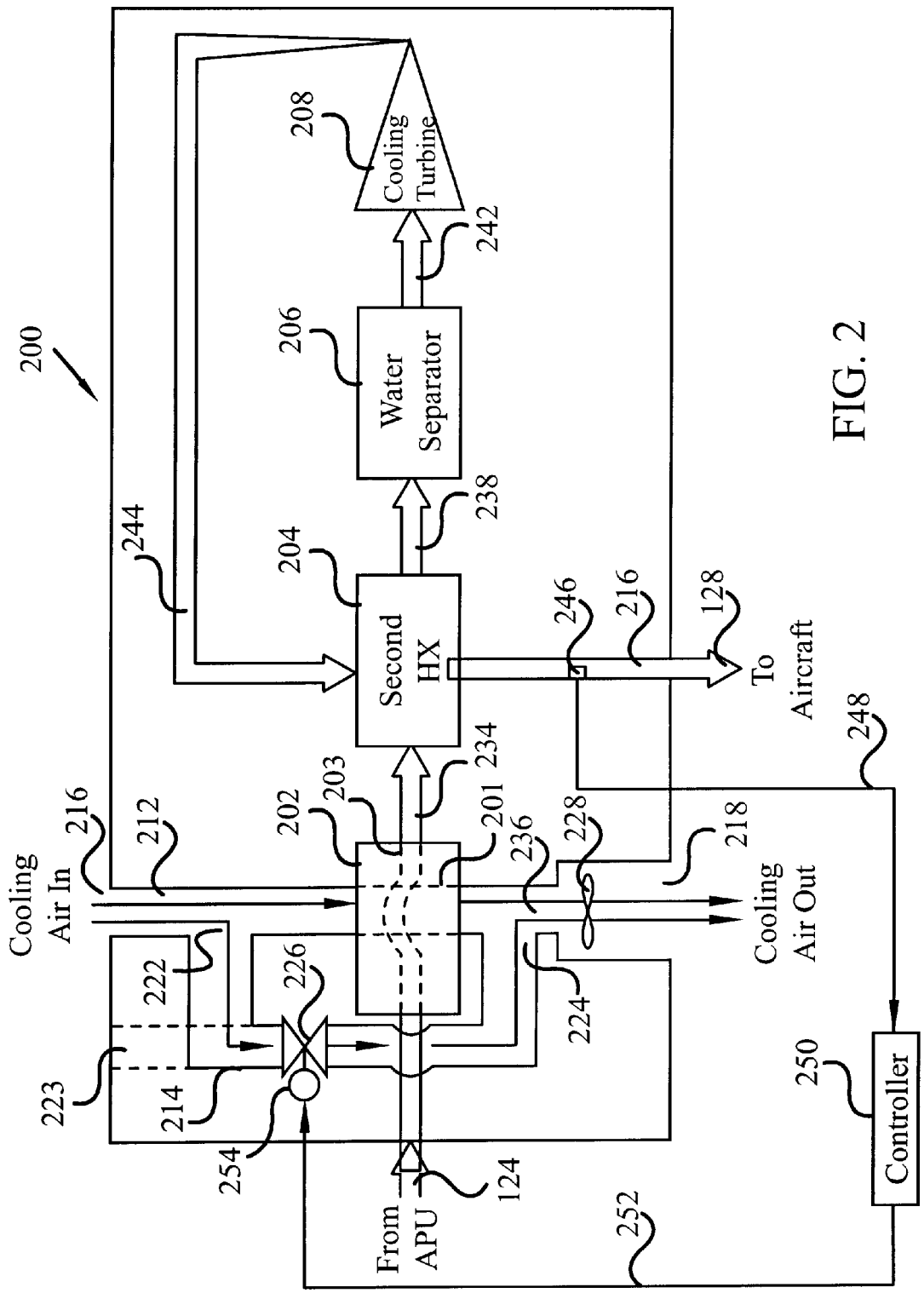
FIG. 2 is a schematic representation of an exemplary embodiment of the air conditioning unit depicted in FIG. 1.

The air conditioning module 200 receives the compressed air 124 from the APU 106, and primary cooling air 126 from a source such as, for example, ambient air, that is drawn into and through the air conditioning module 200. The air conditioning module 200 functions to supply temperature-controlled air 128 to, for example, the environmental control system (ECS) in an aircraft. To accomplish this function, the air conditioning module 200, as depicted more clearly in schematic form in FIG. 2, includes a first heat exchanger 202, a second heat exchanger 204, a moisture separator 206, a cooling turbine 208, a primary air flow passage 212, and a bypass flow passage 214.

The primary air flow passage 212 receives a flow of primary cooling air 126, via an inlet port 216, and exhausts a flow of warmed primary cooling air 236, via an outlet port 218. The bypass flow passage 214 is fluidly coupled in parallel with the primary air flow passage 212. Thus, in the depicted embodiment, the bypass flow passage 214 includes an inlet port 222 in fluid communication with the primary air flow passage inlet port 216, and an outlet port 224 in fluid communication with the primary air flow passage outlet port 218. It will be appreciated that this configuration is only exemplary of a particular preferred embodiment, and that various other configurations can be used, including the one depicted in phantom in FIG. 2, in which an alternative bypass flow passage inlet 223 is in fluid communication with the source of the primary cooling air 126 may be used.

A bypass valve 226 is mounted on the bypass flow passage 214. The bypass valve 226 may be any one of numerous known valve designs presently known in the art, or developed in the future, but the presently preferred valve design is a butterfly valve. The bypass valve 226 is selectively moveable between a closed and an open position, and its position determines the flow rate of primary cooling air 126 through the first heat exchanger 202. More particularly, if the bypass valve 226 is fully closed, substantially all of the primary cooling air 126 drawn into the air conditioning module 200 flows through the first heat exchanger 202. As the bypass valve 226 is opened, a fraction of the primary cooling air 126 drawn into the air conditioning unit 200 flows through the bypass flow passage 214, thereby reducing the primary cooling air flow rate through the first heat exchanger 202. Thus, the bypass valve 226 may be used to control the flow of primary cooling air 126 through the first heat exchanger 202.

A fan 228 draws the primary cooling air 126 into the air conditioning module 200, through the primary air flow passage 212 and, if the bypass valve 226 is open, through the bypass flow passage 214. In the depicted embodiment, the fan 228 is positioned within the air conditioning module 200 to "pull" the primary cooling air 126 through the first heat exchanger 202. It will be appreciated that the fan 228 could also be positioned within the air conditioning module 200 to "push" the primary cooling air 126 through the first heat exchanger 202. Alternatively, the fan 228 may be eliminated if an outside power source is used to move air through the primary air flow passage 212.

The first heat exchanger 202 includes at least two flow paths. The first fluid flow path 201 is fluidly coupled in series in the primary air flow passage 212. The second fluid flow path 203 is coupled to receive the compressed air 124 supplied from the APU 106. As the primary cooling air 126 flows through the first fluid flow path 201, it cools the compressed air 124 as it flows through the second fluid flow path 203. Thus, the first heat exchanger 202 not only receives the primary cooling air 126 and the compressed air 124, it also supplies warmed primary cooling air 236 and cooled compressed air 234.

The cooled compressed air 234 that exits the first heat exchanger 202 second flow path 203 is directed through the second heat exchanger 204. In the second heat exchanger 204, the cooled compressed air 234 from the first heat exchanger 202 is further cooled by another flow of air. Specifically, air 244 that is exhausted from the cooling turbine 208 is also directed through the second heat exchanger 204, and is used to further cool the cooled compressed air 234 from the first heat exchanger 202. The cooling turbine exhaust air 244 that is warmed by the compressed air in the second heat exchanger 204 flows out the temperature-controlled air supply port 216, which supplies the temperature-controlled air 128 to, for example, an aircraft.

The further cooled compressed air 238 flowing out of the second heat exchanger 204 may contain moisture. Therefore, this air is directed through the moisture separator 206. The moisture separator 206 may be any one of numerous devices known now, or provided in the future, for removing moisture from a flowing gas. In a particular preferred embodiment, the moisture separator 206 is the type that removes moisture by centrifugally separating free water droplets from the air flow, and exhausting the free water. Thereafter, the dry, further cooled compressed air 242 that exits the moisture separator 206 is directed into the cooling turbine 208. This air 242 impinges upon rotating blades (not illustrated) in the cooling turbine 208, causing the blades to rotate. As the air impinges on the rotating blades, work is extracted from the air, cooling the air even further. As noted above, the air 244 exhausted from the cooling turbine 208 is then directed through the second heat exchanger 204 where it is warmed and directed out the temperature-controlled air outlet port 216, supplying the temperature-controlled air 128.

The temperature of the air 128 that exits the temperature-controlled air outlet port 216 is determined by the temperature of the cooled compressed air 234 that exits the first heat exchanger 202. Moreover, the temperature of the cooled compressed air 234 can be controlled by controlling the flow rate of primary cooling air 126 through the first heat exchanger 202. The primary cooling air flow rate through the first heat exchanger 202 may be in turn be controlled by controlling the flow rate of the primary cooling air 126 through the bypass flow passage 214, which is controlled by positioning the bypass valve 226. Hence, the temperature of the temperature-controlled air 128 exiting the outlet port 216 may be controlled by controlling the position of the bypass valve 226.

Various control schemes can be used to selectively position the bypass valve 226, including various manual and automatic control schemes. In the depicted embodiment, an automatic control scheme is used. A temperature sensor 246 is positioned in the temperature-controlled air outlet port 216. The temperature sensor 246 may be any one of numerous sensors including, but not limited to, a capillary bulb temperature sensor, a resistance temperature detector (RTD), a thermocouple, or an optical temperature sensor. The temperature sensor 246 supplies a signal 248 representative of the temperature of the air 128 exiting the temperature-controlled air outlet port 216 to a controller 250. The controller 250 processes the temperature signal 248 and supplies an appropriate valve control signal 252 to a bypass valve operator 254 that is coupled to the bypass valve 226. The valve control signal 252 causes the bypass valve operator 254 to position the bypass valve 226, as necessary, so that the temperature of the air 128 exiting the temperature-controlled air outlet port 216 achieves the desired temperature. It will be appreciated that the position of the temperature sensor 246 is not limited to the temperature-controlled air outlet port 216, but could instead be located in any one of numerous positions downstream of the first heat exchanger 202. For example, the temperature sensor 246 could be positioned so that it directly senses the temperature of the cooled compressed air 234 exiting the first heat exchanger 202. It will be appreciated that in any one of the numerous positions, the temperature sensor 246 will supply a temperature signal representative of the temperature of the cooled compressed air 234 exiting the first heat exchanger 202. It will additionally be appreciated that the bypass valve operator 254 could be any one of numerous types of operators including, but not limited to, pneumatic, hydraulic, and electric. Various control schemes may be used as needed for particular applications and configurations.

The temperature control system and method implemented in the air conditioning module allows the temperature of the cool air supplied by the module to be more precisely and more easily controlled. In addition, because high temperature and/or high pressure ductwork and valves are not needed, the system and method reduce the cost of the air conditioning module as compared to present configurations.

While the invention has been described with reference to a preferred embodiment, it will be understood by those skilled in the art that various changes may be made and equivalents may be substituted for elements thereof without departing from the scope of the invention. In addition, many modifications may be made to adapt to a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

I claim:

1. A temperature-controlled air supply system for use with a compressed air source and for connection to an aircraft on the ground, the air supply system comprising:

a primary air flow passage coupled to receive a flow of primary air form a single primary air source;

a bypass flow passage fluidly coupled in parallel with the primary air flow passage;

a first heat exchanger having at least a first fluid flow path and a second fluid flow path, the first fluid flow path fluidly coupled in series in the primary air flow passage, the second fluid flow path coupled to receive a flow of compressed air from the compressed air source, the first heat exchanger adapted to transfer heat between the primary air and the compressed air and supply at least conditioned compressed air; and a bypass valve mounted on the bypass flow passage and selectively moveable between a closed and an open position to control primary air flow rate through the bypass flow passage, whereby primary air flow rate through the first heat exchanger is controlled to thereby control conditioned compressed air temperature.

2. The system of claim 1, further comprising:

a temperature sensor mounted downstream of the first heat exchanger second fluid flow path and operable to supply a temperature signal representative of the conditioned compressed air;

a controller coupled to receive the temperature signal from the temperature sensor and operable, in response thereto, to supply a valve control signal; and a valve operator coupled to receive the valve control signal and operable, in response thereto, to selectively move the bypass valve to control primary air flow rate through the bypass flow passage.

3. The system of claim 1, further comprising:

at least one cooling turbine having an air intake port and an air exhaust port;

a second heat exchanger coupled to receive the conditioned compressed air from the first heat exchanger and turbine exhaust air from the cooling turbine air exhaust port, and adapted to transfer heat from the conditioned compressed air to the cooled air exhausted from the cooling turbine and supply warmed turbine exhaust air and further conditioned compressed air.

4. The system of claim 3, wherein the cooling turbine air stake is coupled to receive the further conditioned compressed air from the second heat exchanger.

5. The system of claim 4, further comprising:

a moisture separator coupled between the second heat exchanger and the cooling turbine air intake.

6. The system of claim 1, further comprising:

a fan operable to draw the primary air from a primary air source into the primary air flow passage.

7. The system of claim 6, wherein the fan is further operable to draw the primary air into the bypass flow passage.

8. The system of claim 6, wherein the fan is configured to pull the primary air through the first heat exchanger.

9. The system of claim 6, wherein the fan is configured to push the primary air through the first heat exchanger.

10. The system of claim 1, wherein the primary air is ambient air.

11. The system of claim 1, wherein the compressed air source is an auxiliary power unit (APU).

12. The system of claim 1, wherein the compressed air source is a diesel engine driven compressor.

13. A method of conditioning compressed air supplied from an aircraft ground support equipment, the method comprising:

supplying a flow of compressed air through a first heat flow path in a heat exchanger;

supplying a flow of primary air from a single source through a second flow path in the heat exchanger to thereby condition the compressed air to a temperature; and selectively diverting a portion of the primary air away from the second heat exchanger flow path to control primary air flow rate through the second heat exchanger flow path, whereby the temperature of the conditioned compressed air exiting the heat exchanger is controlled.

14. The method of claim 13, further comprising:

flowing the conditioned compressed air through a second heat exchanger; and flowing turbine exhaust air through the second heat exchanger to thereby further cool the cooled compressed air and warm the turbine exhaust air.

15. The method of claim 14, further comprising:

supplying the warmed turbine exhaust air as the temper controlled air to the aircraft.

16. The method of claim 14, further comprising:

flowing the further cooled compressed air into an air intake of the cooling turbine.

17. The method of claim 13, further comprising:

supplying the primary air from ambient surroundings.

18. The method of claim 13, further comprising:

supplying the compressed air from an auxiliary power unit (APU).

19. A temperature-controlled air supply system for use with a compressed air source and for connection to an aircraft on the ground, the air supply system comprising;

a primary air flow passage coupled to receive a flow of primary air;

a bypass flow passage fluidly coupled in parallel with the primary air flow passage;

a first heat exchanger having at least a first fluid flow path and a second fluid flow path, the first fluid flow path fluidly coupled in series in the primary air flow passage, the second fluid flow path coupled to receive a flow of compressed air from the compressed air source, the first heat exchanger adapted to transfer heat between the primary air and the compressed air and supply at least conditioned compressed air;

a bypass valve mounted on the bypass flow passage and selectively moveable between a closed and an open position to control primary air flow rate trough the bypass flow passage, whereby pay air flow rate trough the first heat exchanger is controlled to thereby control conditioned compressed air temperature;

a second beat exchanger coupled to receive the conditioned compressed air from the first heat exchanger and turbine exhaust air from a cooling turbine, and adapted to transfer heat from the conditioned compressed air to the turbine exhaust air and supply warmed turbine exhaust air and further conditioned compressed air;

at least one cooling turbine having an air intake in fluid communication with the second heat exchanger to receive therefrom the firer conditioned compressed air and an air exhaust in fluid communication with the second heat exchanger to supply thereto the turbine exhaust air;

a moisture separator coupled between the second heat exchanger and the cooling turbine air intake;

a fan operable to draw the primary air from the primary air source into the primary air flow passage;

a temperature sensor mounted downstream of the first heat exchanger second fluid flow path and operable to supply a temperature signal representative of the conditioned compressed air;

a controller coupled to receive the temperature signal from the temperature sensor and operable, in response thereto, to supply a valve control signal; and a valve operator coupled to receive the valve control signal and operable, in response thereto, to selectively move the bypass valve to control primary air flow rate through the bypass flow passage.

* * * * *